United States Patent
Lee et al.

(10) Patent No.: US 10,492,284 B2
(45) Date of Patent: Nov. 26, 2019

(54) EUV GENERATING DEVICE

(71) Applicant: Samsung Electronics Co., Ltd., Suwon-si, Gyeonggi-do (KR)

(72) Inventors: Hyun Joo Lee, Suwon-si (KR); Kyung Sik Kang, Bucheon-si (KR); Ji-Hyun Lim, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 16/110,482

(22) Filed: Aug. 23, 2018

(65) Prior Publication Data

US 2019/0239328 A1  Aug. 1, 2019

(30) Foreign Application Priority Data

Feb. 1, 2018  (KR) .................. 10-2018-0012809

(51) Int. Cl.
*H05G 2/00* (2006.01)
*G02B 17/00* (2006.01)

(52) U.S. Cl.
CPC ........... *H05G 2/008* (2013.01); *G02B 17/004* (2013.01)

(58) Field of Classification Search
CPC ........................... H05G 2/008; G02B 17/004
USPC ................. 250/493.1, 503.1, 504 R
See application file for complete search history.

(56) References Cited

U.S. PATENT DOCUMENTS

| | | | |
|---|---|---|---|
| 6,818,912 B2 | 11/2004 | Koshelev et al. | |
| 6,982,421 B2 | 1/2006 | Sato et al. | |
| 8,476,609 B2 | 7/2013 | Endo et al. | |
| 8,779,403 B2 | 7/2014 | Lee et al. | |
| 9,671,698 B2 | 6/2017 | Schimmel et al. | |
| 2012/0327381 A1 | 12/2012 | Labetski et al. | |
| 2015/0097107 A1 | 4/2015 | Lim et al. | |
| 2017/0064799 A1 | 3/2017 | Yabu et al. | |

FOREIGN PATENT DOCUMENTS

| | | |
|---|---|---|
| JP | 2006-049422 A | 2/2006 |
| JP | 2010-147138 A | 7/2010 |
| KR | 10-2013-0106710 A | 9/2013 |
| KR | 10-2014-0078926 A | 6/2014 |
| WO | WO 2013/141578 A1 | 9/2013 |

OTHER PUBLICATIONS

Na, et al. "Application of actinic mask review system for the preparation of HVM EUV lithography with defect free mask," Proc. SPIE 10145, Metrology, Inspection, and Process Control for Microlithography XXXI, 101450M (Mar. 28, 2017).

*Primary Examiner* — Nicole M Ippolito
*Assistant Examiner* — Hanway Chang
(74) *Attorney, Agent, or Firm* — Lee & Morse, P.C.

(57) ABSTRACT

An extreme ultraviolet (EUV) generating device is provided. The EUV generating device includes a gas cell housing extending in a first direction, a light guide passage extending through the gas cell housing in the first direction, and a gas supply passage to supply a plasma reaction gas. The light guide passage includes an incident portion to receive incident light, a plasma reaction portion, extending from the incident portion in the first direction to generate EUV light due to a reaction between the incident light and the plasma reaction gas, and an emission portion, extending from the plasma reaction portion in the first direction, to emit the EUV light in the first direction. The gas supply passage may be connected to the plasma reaction portion at a side of the gas cell housing and may be inclined at an acute angle with respect to the first direction.

20 Claims, 21 Drawing Sheets

EUV GENERATING DEVICE

CROSS-REFERENCE TO RELATED APPLICATION

Korean Patent Application No. 10-2018-0012809, filed on Feb. 1, 2018, in the Korean Intellectual Property Office, and entitled: "EUV Generating Device," is incorporated by reference herein in its entirety.

BACKGROUND

1. Field

The present disclosure relates to an extreme ultraviolet (EUV) light generating device.

2. Description of the Related Art

An interferometer is a device that observes interference fringes when light from a single source is split into two beams traveling different optical paths and is combined again to produce interference. The interferometer is used to measure and compare wavelengths, optical path lengths, refractive index changes, distances, and/or surface irregularities with precision.

Extreme ultraviolet (EUV) light, which has a shorter wavelength than visible light, can improve resolution according to a diffraction limit, which is proportional to the wavelength of light being observed, in precision measurement using light. Particularly, if light with excellent coherence, e.g., spatial and temporal coherence, can be generated, various applications using interference and diffraction phenomena of light are possible.

A high harmonic wave-type EUV light source has excellent coherence, as compared to other EUV light sources, and may be used as a light source for an EUV interferometer or an EUV scanning microscope. High harmonic generation (HHG) applies a high time-varying electric field to an inert gas, e.g., argon (Ar), neon (Ne), or xenon (Xe), so that electrons are ionized and recombine to generate EUV light.

SUMMARY

According to an exemplary embodiment of the present disclosure, there is provided an extreme ultraviolet (EUV) generating device including a gas cell housing extending in a first direction, a light guide passage extending through the gas cell housing in the first direction, the light guide passage including an incident portion to receive incident light, a plasma reaction portion extending from the incident portion in the first direction to generate EUV light when the incident light and a plasma reaction gas interact, and an emission portion extending from the plasma reaction portion in the first direction to emit the EUV light in the first direction, and a gas supply passage connected to the plasma reaction portion at a side of the gas cell housing at an acute angle with respect to the first direction, the gas supply passage to supply the plasma reaction gas to the plasma reaction portion.

According to the aforementioned and other exemplary embodiments of the present disclosure, there is provided an EUV generating device including a light source emitting an infrared (IR) laser pulse, and a gas cell to receive the IR laser pulse and a plasma reaction gas, and to generate EUV light. The gas cell includes a light guide passage through which the IR laser pulse passes and a gas supply passage connected to the light guide passage at a first acute angle to the light guide passage, the gas supply passage to supply the plasma reaction gas.

According to the aforementioned and other exemplary embodiments of the present disclosure, there is provided an EUV generating device including a gas cell housing including a light guide passage, which extends in a first direction, incident light incident in the first direction to pass through the light guide passage along the first direction, and a gas supply module extending from a side of the gas cell housing, the gas supply module to inject a plasma reaction gas into the light guide passage such that the plasma reaction gas flows in a second direction, opposite to the first direction, wherein the gas supply module includes a gas supply passage that forms a first acute angle with the light guide passage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
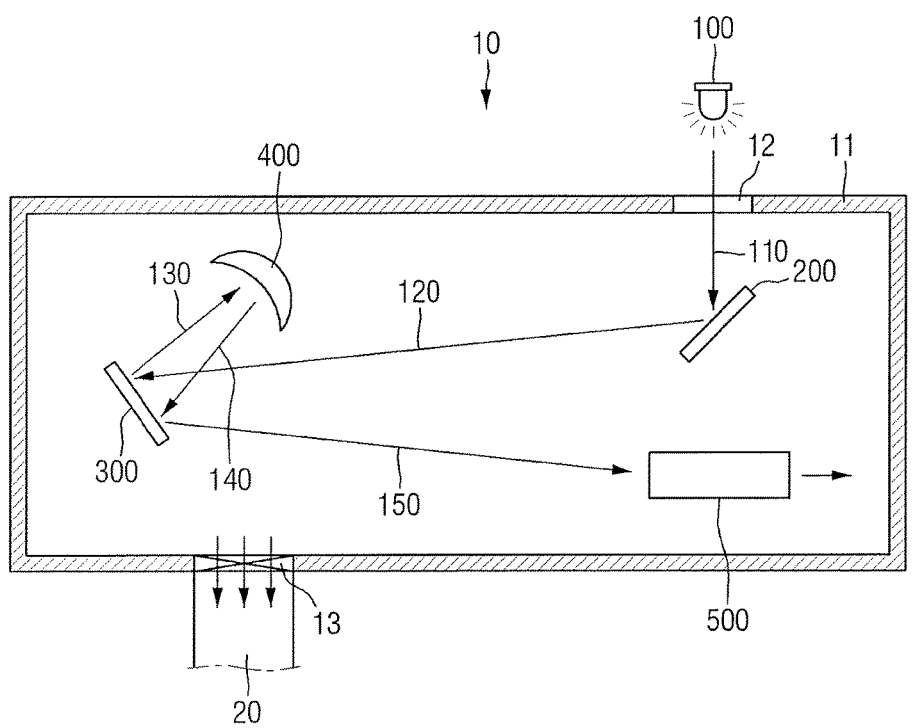
FIG. 1 illustrates a schematic view of an extreme ultraviolet (EUV) generating device according to some exemplary embodiments of the present disclosure.
Figure 2:
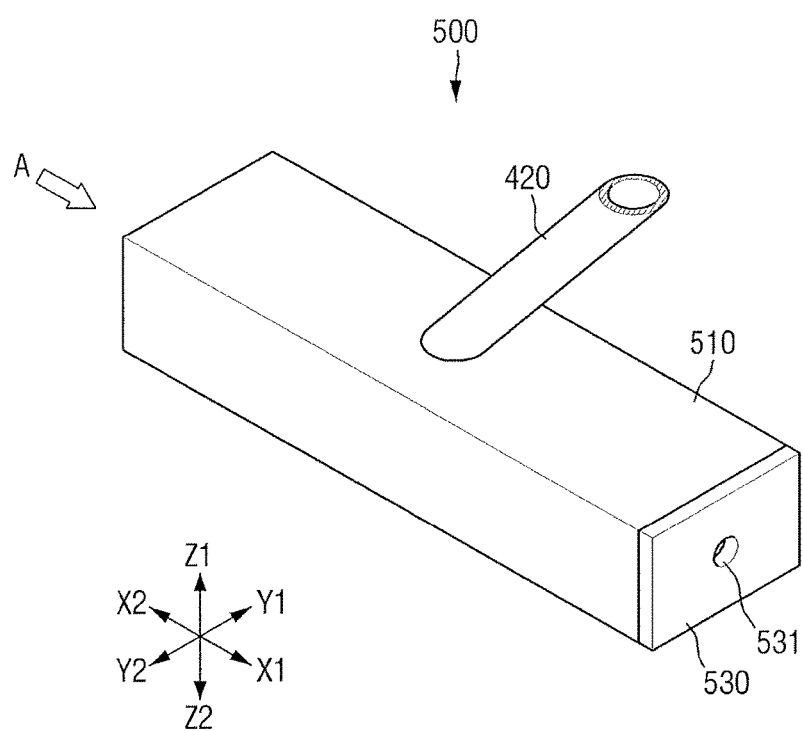
FIG. 2 illustrates a perspective view of a gas cell of FIG. 1.
Figure 3:
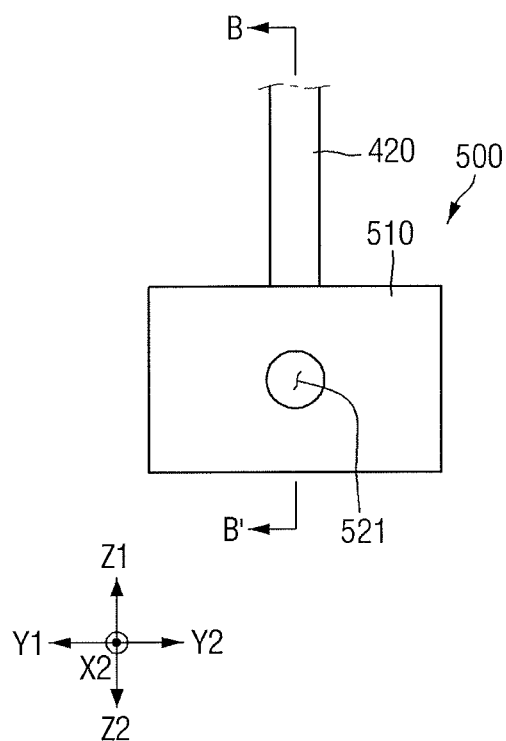
FIG. 3 illustrates a side view of the gas cell of FIG. 1 as viewed from a direction A of FIG. 2.
Figure 4:
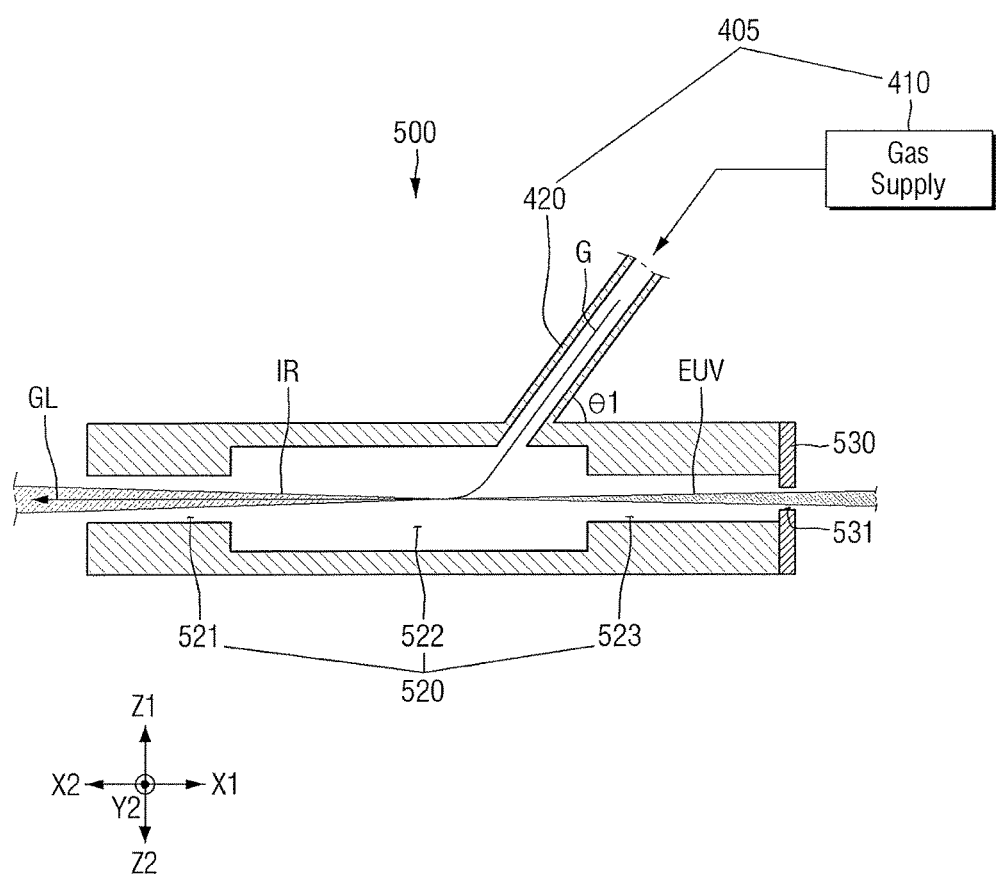
FIG. 4 illustrates a cross-sectional view taken along line B-B' of FIG. 3.
Figure 5:
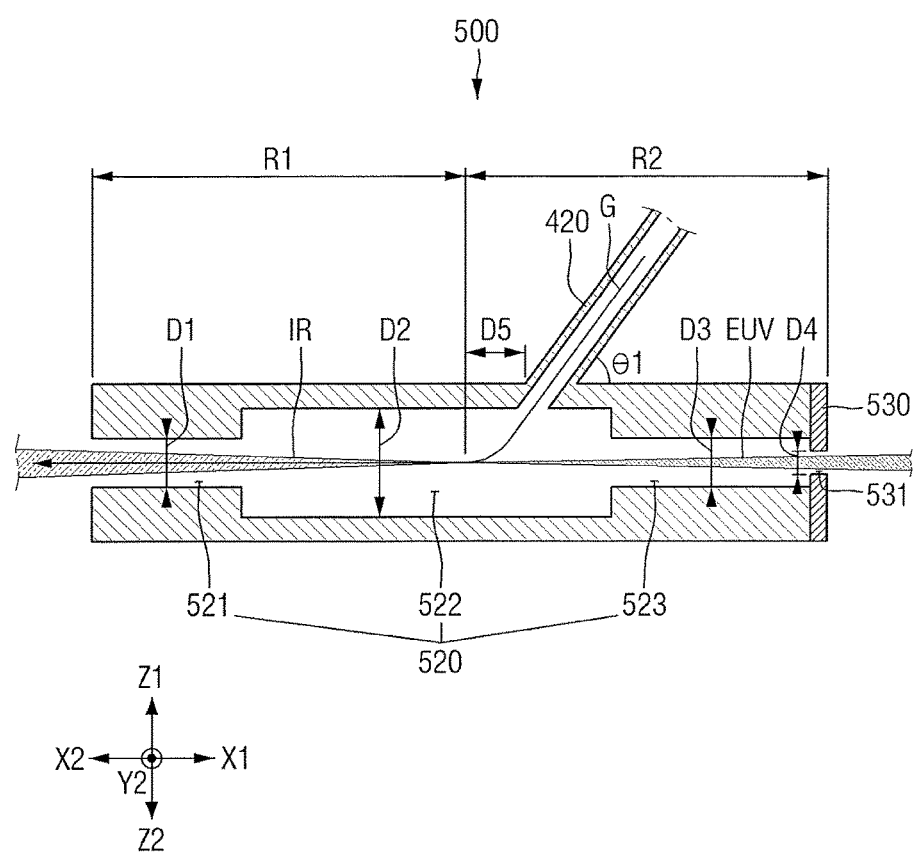
FIG. 5 illustrates a cross-sectional view showing a gas discharge operation performed in a gas cell housing of FIG. 4.

An extreme ultraviolet (EUV) generating device according to some exemplary embodiments of the present disclosure will hereinafter be described with reference to FIGS. 1 through 5. FIG. 1 is a schematic view of an EUV generating device according to some exemplary embodiments of the present disclosure, FIG. 2 is a perspective view of a gas cell of FIG. 1, FIG. 3 is a side view of the gas cell of FIG. 1 as viewed from a direction Z of FIG. 2, FIG. 4 is a cross-sectional view taken along line B-B' of FIG. 3, and FIG. 5 is a cross-sectional view showing a gas discharge operation performed in a gas cell housing of FIG. 4.

Referring to FIG. 1, the EUV generating device according to some exemplary embodiments of the present disclosure may include a vacuum chamber 10, an exhaust device 20, a light source 100, a first reflective mirror 200, a second reflective mirror 300, a focus mirror 400, and a first gas cell 500.

The vacuum chamber 10 may include therein the first gas cell 500 and a guide unit including the first reflective mirror 200, the second reflective mirror 300, and the focus mirror 400. In some exemplary embodiments, at least part of the guide unit may be outside of the vacuum chamber 10, while the first gas cell 500 may be inside the vacuum chamber 10.

The vacuum chamber 10 may include outer walls 11, a window 12, and an exhaust port 13. The outer walls 11, along with the window 12 and the exhaust port 13, may completely separate the inside and the outside of the vacuum chamber 10 and maintain the vacuum inside the vacuum chamber 10, thereby completely sealing the inside of the vacuum chamber 10.

The outer walls 11 may form a housing structure defining the exterior of the vacuum chamber 10 and separating the inside and the outside of the vacuum chamber 10. The window 12 may transmit source light 110 therethrough. That is, the window 12 may be formed of a material transparent to source light 110 output from the light source 100, so that light can be transmitted therethrough. In some exemplary embodiments, when at least some of the first reflective mirror 200, the second reflective mirror 300, and the focus mirror 400 of the guide unit are outside of the vacuum chamber 10, one of the source light 110, first reflected light 120, second reflected light 130, third reflected light 140, and fourth reflected light 150 may be transmitted into the vacuum chamber 10 through the window 12.

The exhaust port 13 may be a hole through which the internal air is exhausted to evacuate the vacuum chamber 10. The exhaust port 13 may be coupled to the exhaust device 20. The exhaust port 13 may be normally closed or may be blocked by the exhaust device 20 to keep the inside of the vacuum chamber 10 under vacuum.

The light source 100 emits the source light 110 (e.g., laser beams) to the first reflective mirror 200. The light source 100 may emit infrared (IR) laser light. The source light 110 may be a laser pulse in units of femtoseconds. For example, the light source 100 may emit titanium sapphire (Ti:Sapphire) femtosecond laser light or yttrium fluoride (Nd:YLF) femtosecond laser light.

The first reflective mirror 200 reflects the source light 110 emitted by the light source 100 as the first reflected light 120. The first reflective mirror 200 may be positioned to have a predetermined angle to reflect the source light 110 as the first reflected light 120 towards the second reflective mirror 300.

The second reflective mirror 300 reflects the first reflected light 120 provided by the first reflective mirror 200 as the second reflected light 130. In a case where a plane mirror, rather than a beam splitter, is used as the second reflective mirror 300, the loss of the second reflected light 130 reaching the focus mirror 400 can be minimized because 99% of the first reflected light 120 may be reflected from the surface of the second reflective mirror 300 as the second reflected light 130. That is, when using a plane mirror as the second reflective mirror 300, the waveform of laser beams is only affected by the reflective surface of the second reflective mirror 300. Accordingly, wavefront distortion of laser beams can be reduced, and the efficiency of EUV generation can be improved.

The focus mirror 400 reflects the second reflected light 130 provided by the second reflective mirror 300 as the third reflected light 140. The focus mirror 400 focuses the second reflected light 130 and increases the amount of the third reflected light 140 reaching the second reflective mirror 300. The second reflective mirror 300 reflects the fourth reflected light 150 back to the first gas cell 500.

The guide unit, including the first reflective mirror 200, the second reflective mirror 300, and the focus mirror 400, may consist of elements for focusing the source light 110 generated by the light source 100 into an optimum state. Thus, the presence, the arrangement, and the number of elements of the guide unit may vary.

The first gas cell 500 may be at a location that can be reached by the fourth reflected light 150 provided by the second reflective mirror 300. An inert gas may exist in the first gas cell 500. The inert gas may be at least one of, e.g., Ne, Ar, krypton (Kr), or Xe. In the first gas cell 500, the fourth reflected light 150 and the inert gas may interact with each other to indirectly cause EUV light to be produced. Specifically, the first gas cell 500 may generate light having a wavelength corresponding to an odd multiple of the wavelength of incident light by using high harmonic generation (HHG) for an inert gas.

The exhaust device 20 may evacuate the vacuum chamber 10 through the exhaust port 13. The air in the vacuum chamber 10 may be sucked out through the exhaust port 13 by the exhaust device 20. As a result, vacuum pressure can be formed and maintained in the vacuum chamber 10. Since EUV light generated in the first gas cell 500 can be absorbed and become extinct upon collision with gases present in the atmosphere, the vacuum chamber 10 should be maintained under a vacuum state.

Referring to FIGS. 2 through 4, the first gas cell 500 may include a gas cell housing 510, a light guide passage 520, a capping film 530, and a gas supply passage 420.

The gas cell housing 510 may include outer walls separating the inside and the outside of the first gas cell 500. The gas cell housing 510 is illustrated as being in the shape of a rectangular parallelepiped. Alternatively, the shape of the gas cell housing 510 may vary.

The gas cell housing 510 may contain, e.g., quartz. The gas cell housing 510 may have a shape extending in a first direction X1, which means that the direction in which the long sides of the gas cell housing 510 extend may be the first direction X1.

The light guide passage 520 may be formed in the gas cell housing 510. The gas supply passage 420 and the light guide passage 520 may be connected to each other inside the gas cell housing 510.

The light guide passage 520 may extend through the gas cell housing 510 in the first direction X1. The light guide passage 520 may have a varying width, but may not change its direction, e.g., may be linear along the first direction X1 inside the gas cell housing 510.

A direction opposite to the first direction X1 may be defined as a second direction X2, and a direction orthogonal to the first and second directions X1 and X2 may be defined as a third direction Y1. A fourth direction Y2 is opposite to the third direction Y1. Accordingly, the fourth direction Y2 may be orthogonal to the first and second directions X1 and X2. A fifth direction Z1 may be orthogonal to both the first and third directions X1 and Y1. The fifth direction Z1 may also be orthogonal to both the second and fourth directions X2 and Y2. A sixth direction Z2 may be opposite to the fifth direction Z1. The sixth direction Z2 may be orthogonal to the first, second, third, and fourth directions X1, X2, Y1, and Y2.

The light guide passage 520 may include an incident portion 521, a plasma reaction portion 522, and an emission portion 523. Incident light "IR" may enter the light guide passage 520 via the incident portion 521. The incident portion 521 may be on the left side of the gas cell housing 510.

The plasma reaction portion 522 may contact, e.g., extend from, the incident portion 521 in the first direction X1. The plasma reaction portion 522 may be where the incident light "IR" and a plasma reaction gas G come into contact. In the plasma reaction portion 522, the incident light "IR" and the plasma reaction gas G react with each other to generate EUV light "EUV".

The EUV light "EUV" may be emitted out of the light guide passage 520 via the emission portion 523. The emission portion 523 may contact, e.g., extend from, the plasma reaction portion 522 in the first direction X1. Accordingly, the incident portion 521, the plasma reaction portion 522, and the emission portion 523 may be sequentially connected in the first direction X1 to form a continuous light guide passage 520 within the gas cell housing 510.

The capping film 530 may be on the right side of the gas cell housing 510, e.g., opposite the incident portion 521 along the first direction X1. The capping film 530 may block, e.g., narrow, an opening formed by the emission portion 523 of the light guide passage 520 inside the gas cell housing 510. Accordingly, leakage of the plasma reaction gas G from the emission portion 523 can be minimized.

The capping film 530 may include a through hole 531. The through hole 531 may be a hole through which the EUV light "EUV" emitted through the emission portion 523 passes. The diameter of the EUV light "EUV" may be smaller than the diameter of the emission portion 523. Thus, the diameter of the through hole 531 may be smaller than the diameter of the emission portion 523. When horizontal shapes of the light guide passage 520 and the through hole 531 are not circular, the area of a horizontal cross section of the through hole 531 parallel to the first direction X1 may be smaller than the area of a horizontal cross section of the emission portion 523 parallel to the first direction X1.

The gas supply passage 420 may be included in a gas supply module 405 and may supply the plasma reaction gas G into the light guide passage 520. The gas supply module 405 may include a gas supply 410 and the gas supply passage 420.

The gas supply 410 may store the plasma reaction gas G. For example, the gas supply 410 may be a gas tank having the plasma reaction gas G stored therein. As mentioned above, the plasma reaction gas G may be an inert gas. For example, the plasma reaction gas G may be at least one of Ne, Ar, Kr, and Xe. The gas supply 410 may be connected to the gas supply passage 420 and may, thus, supply the plasma reaction gas G into the light guide passage 520.

The gas supply passage 420 may be connected to the gas cell housing 510. The gas supply passage 420 may be connected to a side of the gas cell housing 510 in a direction that crosses the first direction X1. The direction that crosses the first direction X1 may be one of, e.g., the third, fourth, fifth, and sixth directions Y1, Y2, Z1, and Z2. That is, the direction that crosses the first direction X1 is not necessarily orthogonal thereto. For convenience, the gas supply passage 420 is illustrated as being connected to the gas cell housing 510 in the fifth direction Z1.

The gas supply passage 420 may be connected to an inner sidewall, in the fifth direction Z1, of the light guide passage 520, e.g., such that gas is supplied to the plasma reaction portion 522. The gas supply passage 420 may be inclined from the fifth direction Z1 toward the emission portion 523, i.e., toward the first direction X1. The angle formed between the light guide passage 520 and the gas supply passage 420 may be a first acute angle θ1, e.g., relative to the first direction X1.

The first acute angle θ1 may be greater than 0° and smaller than 90°. Since the gas supply passage 420 is inclined at the first acute angle θ1, the plasma reaction gas G may have a velocity component in the second direction X2, e.g., within the plasma reaction portion 522. Thus, the plasma reaction gas G injected into the gas supply passage 420 may move toward the incident portion 521 within the plasma reaction portion 522, rather than toward the emission portion 523, and may be discharged to the outside of the first gas cell 500 through the incident portion 521 in a greater proportion than that discharged to the outside of the first gas cell 500 through the emission portion 523.

Referring to FIG. 5, the incident light "IR" may travel along the light guide passage 520 and may then interact with the plasma reaction gas G, supplied by the gas supply passage 420, in the plasma reaction portion 522. The interaction of the incident light "IR" and the plasma reaction gas G converts the incident light "IR" into EUV light "EUV". While the EUV light "EUV" has different optical characteristics from the incident light "IR", e.g., wavelength and frequency, the traveling direction does not change. Thus, the EUV light "EUV" may continue to travel along the light guide passage 520, which extends in the first direction X1, to be discharged to the outside of the first gas cell 500 through the emission portion 523 and the through hole 531 of the capping film 530.

The incident portion 521 and the emission portion 523 of the light guide passage 520 may have a smaller cross-sectional area than the plasma reaction portion 522. The incident portion 521 may have a first width D1 and the plasma reaction portion 522 may have a second width D2. The emission portion 523 may have a third width D3 and the through hole 531 may have a fourth width D4. The second width D2 may be greater than the first, third, and fourth widths D1, D3, and D4, and the fourth width D4 may be smaller than the third width D3, e.g., smaller than the first, second, and third widths D1, D2, and D3. Since the fourth width D4 is smaller than the third width D3 and the first width D1, more of the plasma reaction gas G leftover from generating the EUV light "EUV" is output from the incident portion 521 than from the emission portion 523.

As the density of the plasma reaction gas G increases, the efficiency of EUV generation may increase. However, after generating the EUV light "EUV" by a plasma reaction, the EUV light "EUV" may be absorbed and may be extinguished by remaining or leftover plasma reaction gas GL. Thus, after generating the EUV light "EUV", the intensity of the EUV light "EUV" may be decreased due to leftover plasma reaction gas GL. The higher the concentration of the leftover plasma reaction gas GL, the higher the reabsorption rate of the EUV light "EUV". Therefore, in order to maximize the intensity of the EUV light "EUV", the density of the plasma reaction gas G should be high before a plasma reaction, while the density of the plasma reaction gas GL should be low.

A first region R1 of the light guide passage 520 may be a region where the incident light "IR" passes before the generation of the EUV light "EUV". On the other hand, a second region R2 of the light guide passage 520 may be a region where the EUV light "EUV" passes after the generation of the EUV light "EUV". To maximize the intensity of the EUV light "EUV", the density of the plasma reaction gas G should be high in the first region R1 and low in the second region R2.

In accordance with some exemplary embodiments, the leftover plasma reaction gas GL is released toward the incident portion 521, rather than toward the emission portion 523. In particular, in the EUV generating device according to some exemplary embodiments of the present disclosure, the gas supply passage 420 may be formed at an inclination with respect to the first direction X1. As a result, leftover plasma reaction gas GL can be released to the incident portion 521, rather than to the emission portion 523 to reduce an amount of leftover plasma reaction gas GL along an optical path of the EUV light "EUV" while supplying a sufficient amount of the plasma reaction gas G to the plasma reaction portion 522. In addition to the inclination with respect to the first direction X1, the gas supply passage 420 may also be offset along the first direction X1 from a center of the plasma reaction portion 522, e.g., by a distance D5 from a boundary between the regions R1 and R2, such that the plasma reaction gas G entering from the supply passage 420 is directed to a center of the plasma reaction portion 522, e.g., along both the first X1 direction and the fifth Z1 direction.

The degree of vacuum of the vacuum chamber 10 may be greater than the degree of vacuum of the first gas cell 500. That is, the pressure inside the vacuum chamber 10 may be lower than the pressure inside the first gas cell 500. Accordingly, the leftover plasma reaction gas GL can be released naturally from the inside of to the outside of the first gas cell 500. Also, due to the inclination of the gas supply passage 420, a greater proportion of the leftover plasma reaction gas GL can be released from the incident portion 521, rather from than to the emission portion 523, as indicated by the arrow in FIG. 5 exiting the incident portion 521 of the first gas cell 500.

An EUV generating device according to some exemplary embodiments of the present disclosure will hereinafter be described with reference to FIGS. 5 through 9. Descriptions of elements or features that are the same as their respective counterparts of the EUV generating device according to the exemplary embodiment of FIGS. 1 through 5 will be omitted or simplified.

Figure 6:
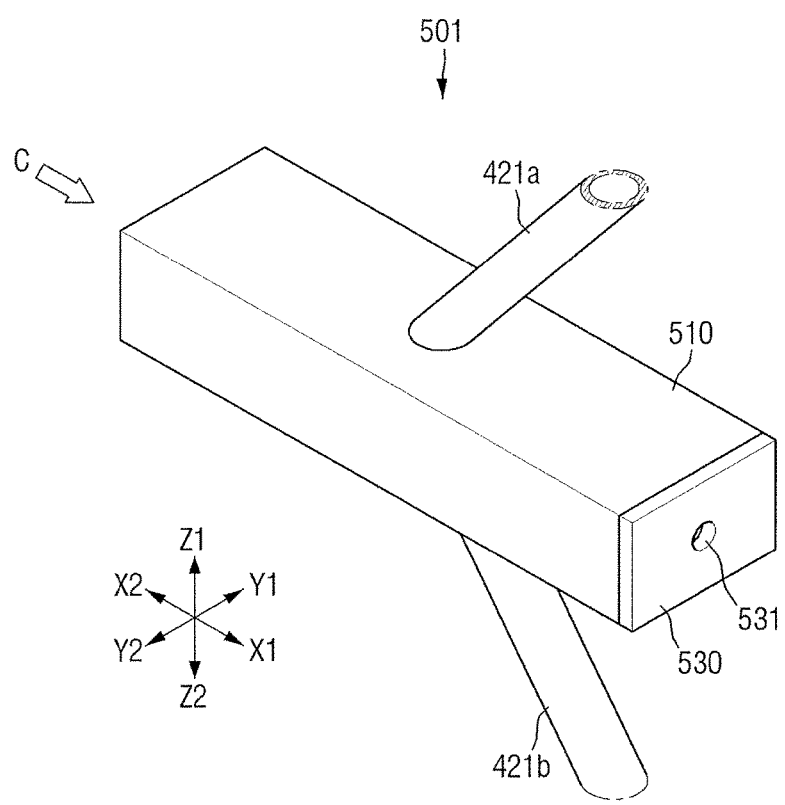
FIG. 6 illustrates a perspective view of an EUV generating device according to some exemplary embodiments of the present disclosure.
Figure 7:
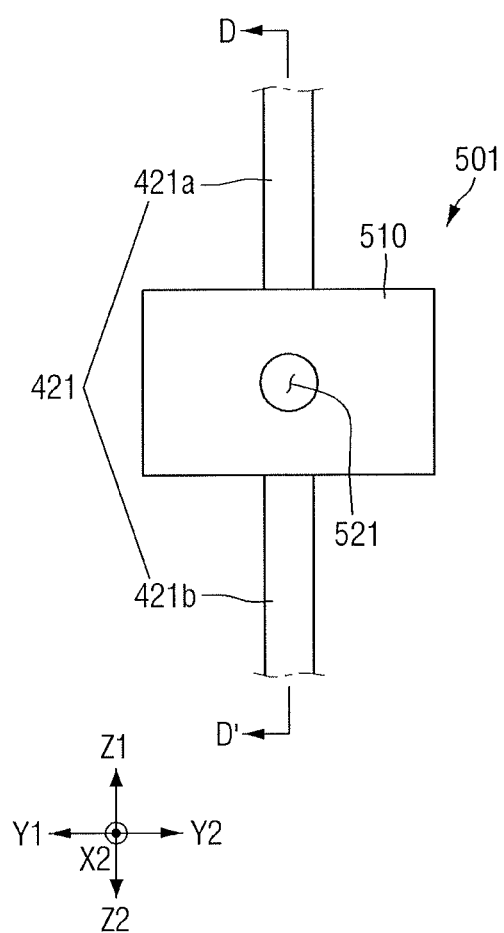
FIG. 7 illustrates a side view of a gas cell of FIG. 6 as viewed from a direction C of FIG. 6.
Figure 8:
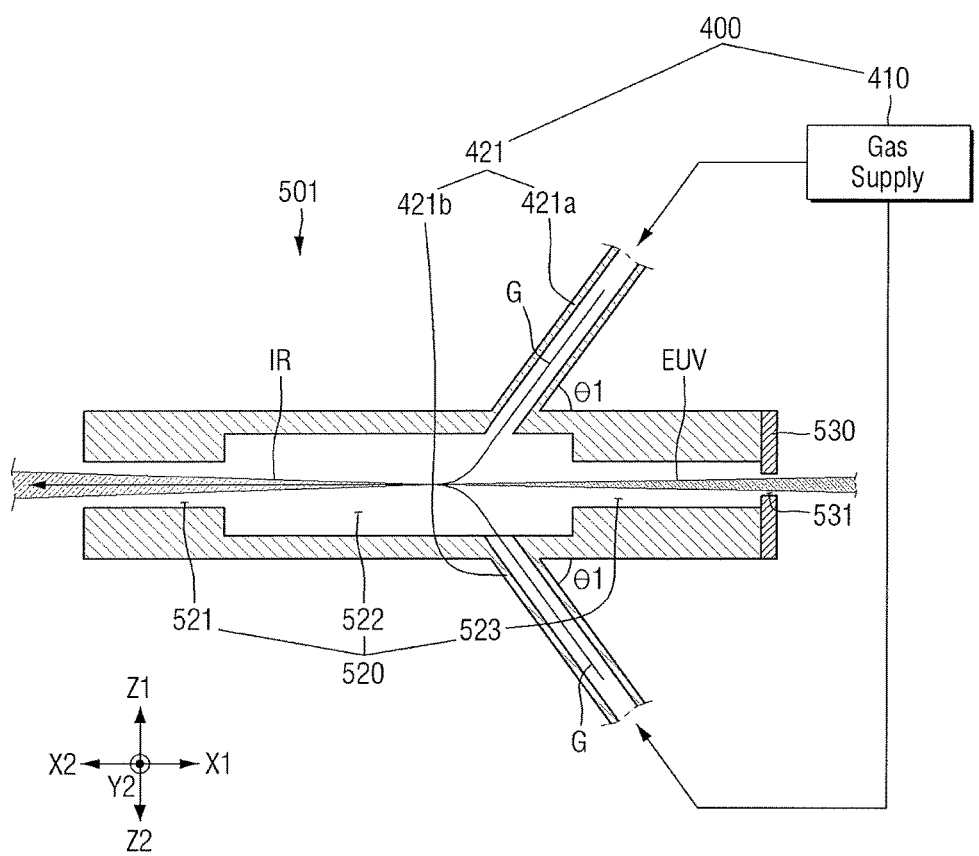
FIG. 8 illustrates a cross-sectional view taken along line D-D' of FIG. 7.
Figure 9:
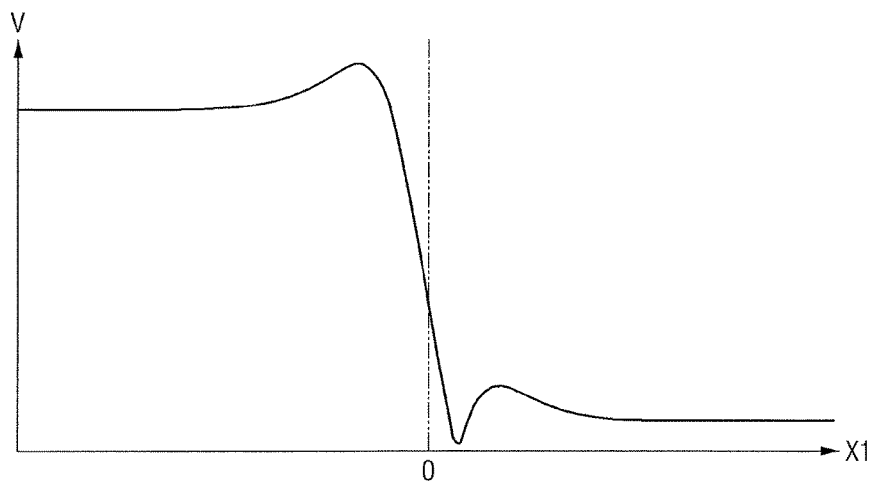
FIG. 9 illustrates a graph showing simulation results of the airflow inside the gas cell of FIG. 6.

FIG. 6 is a perspective view of an EUV generating device according to some exemplary embodiments of the present disclosure, FIG. 7 is a side view of a gas cell of FIG. 6 as viewed from a direction C of FIG. 6, FIG. 8 is a cross-sectional view taken along line D-D' of FIG. 7, and FIG. 9 is a graph showing simulation results of the airflow inside the gas cell of FIG. 6.

Referring to FIGS. 6 through 8, the EUV generating device according to some exemplary embodiments of the present disclosure may include a second gas cell 501, which has a gas supply passage 421 that includes first and second gas supply passages 421a and 421b. The first and second gas supply passages 421a and 421b may be arranged symmetrically with respect to each other, e.g., mirror symmetry along the first direction X1. The first and second gas supply passages 421a and 421b may extend from the gas cell housing at orthogonal angles to each other.

For example, as illustrated in FIG. 6, when the first gas supply passage 421a is on the top surface of the gas cell housing 510, the second gas supply passage 420b is on the bottom surface of the gas cell housing 510. Herein, it is assumed that the first gas supply passage 421a is connected to an inner sidewall, in the fifth direction Z1, of a light guide passage 520, and that the second gas supply passage 421b is connected to an inner sidewall, in the sixth direction Z2, of the light guide passage 520.

A gas supply 410 may supply a plasma reaction gas G to the first and second gas supply passages 420a and 420b. Accordingly, a plasma reaction portion 522 of the light guide passage 520 can be supplied with the plasma reaction gas G in both the fifth and sixth directions Z1 and Z2.

The gas supply 410 may use a pulse-type injection method. That is, the gas supply 410 may allow the first and second gas supply passages 421a and 421b to supply the plasma reaction gas G to the light guide passage 520 in a pulse manner. The pulse-type injection method can promote the formation of a laminar flow that will be described later.

The first gas supply passage 421a may be inclined from the fifth direction Z1 toward an emission portion 523, i.e., toward the first direction X1. Similarly, the second gas supply passage 421b may be inclined from the sixth direction Z2 toward the emission portion 523, i.e., toward the first direction X1.

The angle formed between the light guide passage 520 and the first gas supply passage 421a may be a first acute angle θ1. The angle formed between the light guide passage 520 and the second gas supply passage 420b may also be the first acute angle θ1. That is, since two gas supply passages 421a and 421b are inclined at the same angle, i.e., the first acute angle θ1, the velocity components of the plasma reaction gas G that are symmetrical with respect to each other may offset each other.

Specifically, the velocity components of the plasma reaction gas G in the fifth and sixth directions Z1 and Z2 may offset each other, thereby leaving only the velocity component in the second direction X2 to form a laminar flow or a jet stream. Since a laminar flow, unlike a turbulent flow, is regular, the proportion of the leftover plasma reaction gas GL output from the incident portion 521 along the second direction X2 may be increased.

In order to promote the formation of a laminar flow in the second gas cell 501, connecting portions between the inside of the light guide passage 520 and the gas supply passages 420 may be formed in a streamlined manner. For example, height differences between the incident portion 521 and the plasma reaction portion 522 of the light guide passage 520, between the plasma reaction portion 522 and the emission portion 523, and the gas supply passages 420 and the plasma reaction portion 522 may be rounded, e.g., may gradually rather than abruptly, increase, to not interfere with airflow. In this manner, the formation of a laminar flow can be further promoted.

Referring to FIGS. 5 and 9, the X axis represents locations in the first direction X1, and the Y axis represents velocities V of airflow. Here, a location satisfying X1=0 may be a location where the first and second regions R1 and R2 adjoin each other. That is, a location where the incident light "IR" is converted into the EUV light "EUV" is the location satisfying X1=0.

As is apparent from FIG. 9, due to the formation of a laminar flow, the plasma reaction gas G has a high velocity in the first region R1 where the incident light "IR" passes, but has a low velocity in the second region R2 where the EUV light "EUV" passes. That is, by forming the gas supply passage 421 at an inclination, laminar flow can be generated. As a result, the reabsorption of the EUV light "EUV" can be minimized, and the intensity of the EUV light "EUV" can be maximized.

An EUV generating device according to some exemplary embodiments of the present disclosure will hereinafter be described with reference to FIGS. 10 through 13. Descriptions of elements or features that are the same as their respective counterparts of any one of the EUV generating devices according to the exemplary embodiments of FIGS. 1 through 9 will be omitted or simplified.

Figure 10:
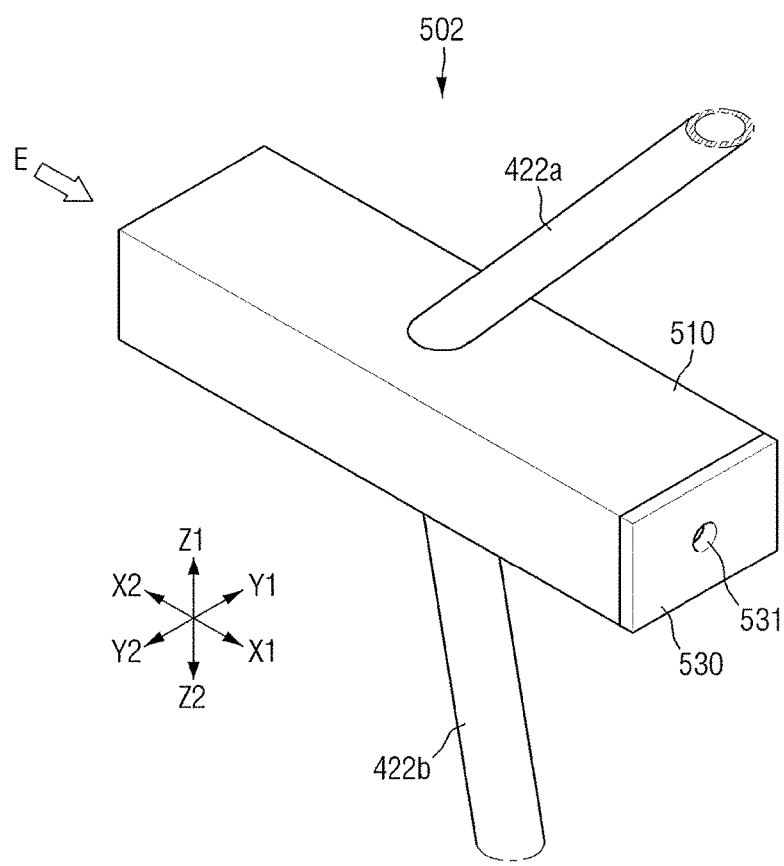
FIG. 10 illustrates a perspective view of an EUV generating device according to some exemplary embodiments of the present disclosure.
Figure 11:
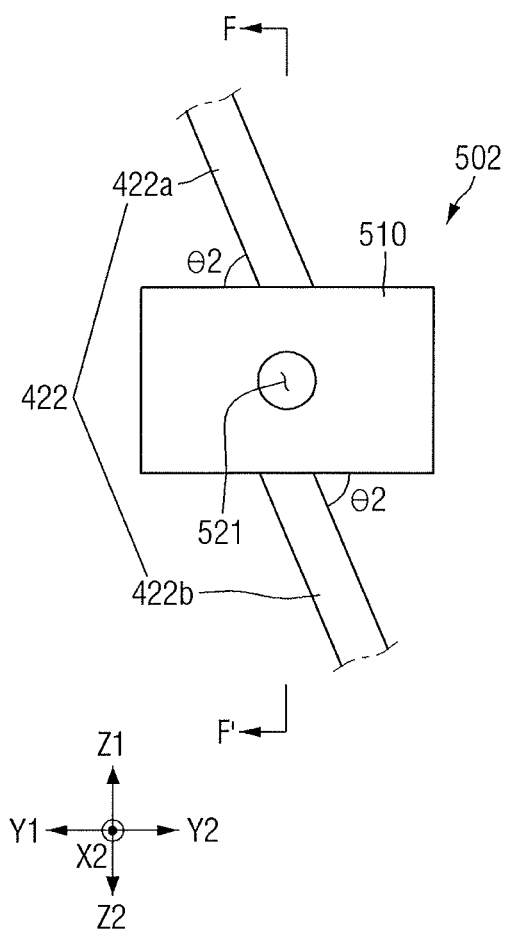
FIG. 11 illustrates a side view of a gas cell of FIG. 10 as viewed from a direction E of FIG. 10.
Figure 12:
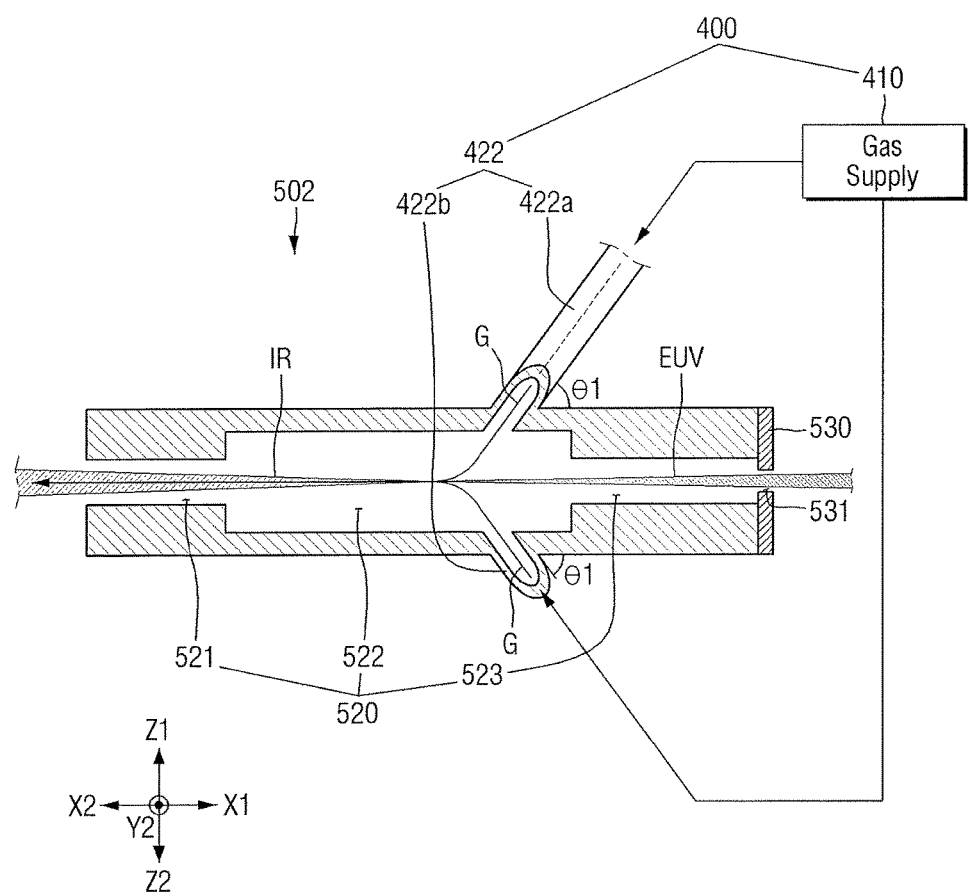
FIG. 12 illustrates a cross-sectional view taken along line F-F' of FIG. 7.
Figure 13:
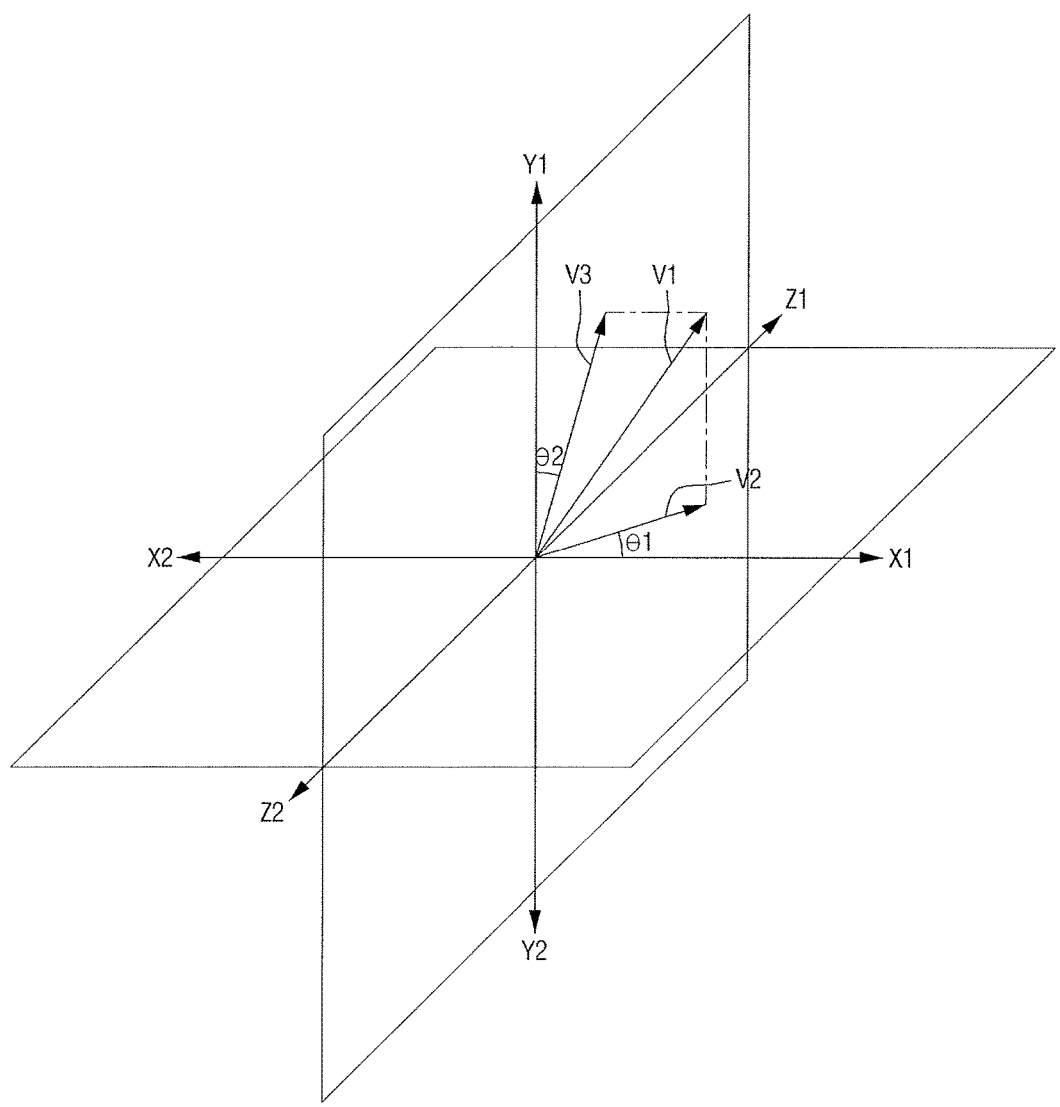
FIG. 13 illustrates a schematic view showing vectors for explaining a direction in which gas supply passages of FIG. 10 are inclined.

FIG. 10 is a perspective view of an EUV generating device according to some exemplary embodiments of the present disclosure. FIG. 11 is a side view of a gas cell of FIG. 10 as viewed from a direction E of FIG. 10. FIG. 12 is a cross-sectional view taken along line F-F' of FIG. 11. FIG. 13 is a schematic view showing vectors for explaining a direction in which gas supply passages of FIG. 10 are inclined.

Referring to FIGS. 10 through 13, the EUV generating device according to some exemplary embodiments of the present disclosure may include a third gas cell 502, in which a gas supply passage 422 include two gas supply passages 422a and 422b that extend from the gas cell housing 510 in a spiral manner. Specifically, first and second gas supply passages 422a and 422b may be inclined with respect to the light guide passage 520 in opposite directions. For example, as illustrated in FIG. 12, on a plane defined by the first direction X1 (or the second direction X2) and the fifth direction Z1 (or the sixth direction Z2), the first and second gas supply passages 422a and 422b may be inclined, in the fifth and sixth directions Z1 and Z2, respectively, at a first acute angle θ1 with respect to the first direction X1.

Also, as illustrated in FIG. 11, on a plane defined by the third direction Y1 (or the fourth direction Y2) and the fifth direction Z1 (or the sixth direction Z2), the first and second gas supply passages 422a and 422b may be inclined, in opposite directions, at a second acute angle θ2 with respect to the third direction Y1 (or the fourth direction Y2). Specifically, the first gas supply passage 422a may be inclined toward in the third direction Y1, and the second gas supply passage 422b may be inclined toward the fourth direction Y2.

That is, referring to FIG. 13, when the light guide passage 520 extends in the first direction X1 (or the second direction X2), the first gas supply passage 422a may be represented by a first vector V1. The orthogonal projection of the first vector V1 on a plane (i.e., an X1-Z1 plane) defined by the first and fifth directions X1 and Z1, i.e., a second vector V2, may be inclined at the first acute angle θ1 with respect to the first direction X1. Similarly, the orthogonal projection of the first vector V1 on a plane (i.e., an Y1-Z1 plane) defined by the third and fifth directions Y1 and Z1, i.e., a third vector V3, may be inclined at the second acute angle θ2 with respect to the third direction Y1.

When the first and second gas supply passages 422a and 422b are symmetrically inclined in the third and fourth directions Y1 and Y2, respectively, the velocity components of a plasma reaction gas G in the third and fourth directions Y1 and Y2 offset each other, thereby leaving only the velocity component in the second direction X2. As a result, the probability of the formation of a turbulent flow can be reduced, and the formation of a laminar flow can be further promoted. Therefore, a reduction in the intensity of EUV light "EUV" can be minimized by further lowering the density of the leftover plasma reaction gas GL.

An EUV generating device according to some exemplary embodiments of the present disclosure will hereinafter be described with reference to FIGS. 14 and 15. Descriptions of elements or features that are the same as their respective counterparts of any one of the EUV generating devices according to the exemplary embodiments of FIGS. 1 through 13 will be omitted or simplified.

Figure 14:
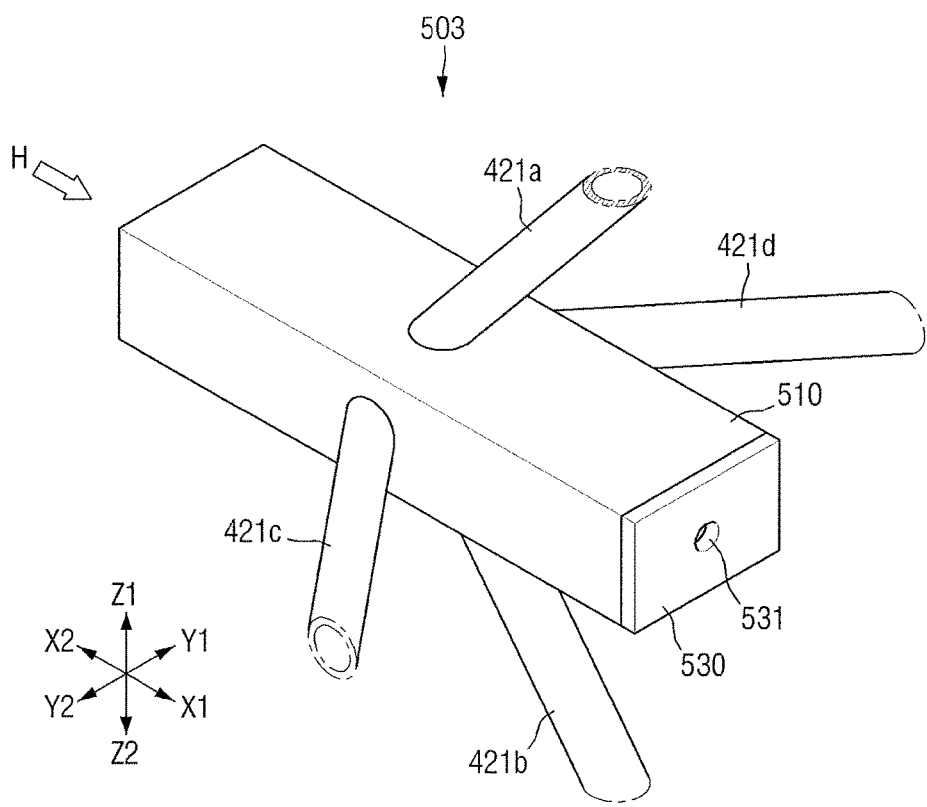
FIG. 14 illustrates a perspective view of an EUV generating device according to some exemplary embodiments of the present disclosure.
Figure 15:
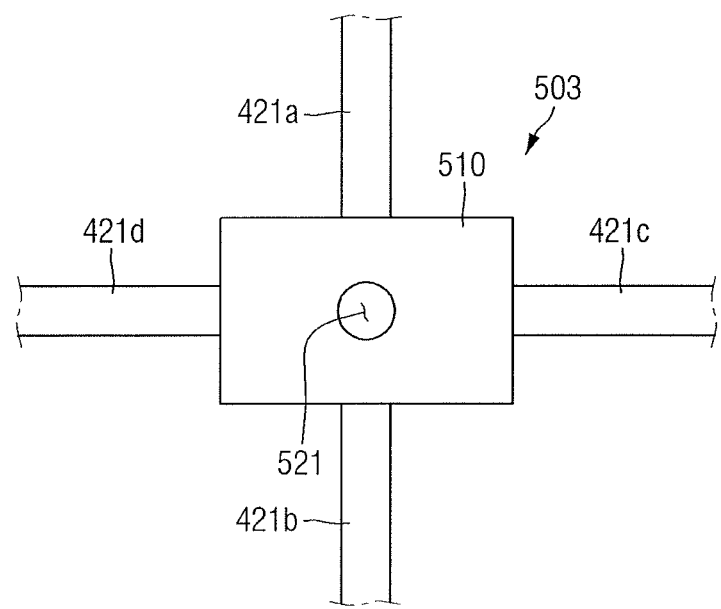
FIG. 15 illustrates a side view of a gas cell of FIG. 14 as viewed from a direction G of FIG. 14.

FIG. 14 is a perspective view of an EUV generating device according to some exemplary embodiments of the present disclosure, and FIG. 15 is a side view of a gas cell of FIG. 14 as viewed from a direction G of FIG. 14. Referring to FIGS. 14 and 15, the EUV generating device according to some exemplary embodiments of the present disclosure may include a fourth gas cell 503, which has four gas supply passages. Specifically, the fourth gas cell 503 may include first and second gas supply passages 421a and 421b, and may further include third and fourth gas supply passages 421c and 421d.

The third and fourth gas supply passages 420c and 420d may be arranged symmetrically with respect to each other, e.g., mirror symmetry along the third direction Y1 or the fourth direction Y2. For example, as illustrated in FIGS. 14 and 15, when the third gas supply passage 420c is on a first side, in the fourth direction Y2, of a gas cell housing 510, the fourth gas supply passage 420d may be on an opposite, second side, in the third direction Y1, of the gas cell housing 510. Alternatively, the third and fourth gas supply passages 420c and 420d may be in two opposite directions that are both orthogonal to the first direction X1 other than the third and fourth directions Y1 and Y2. For example, on a plane defined by the third direction Y1 (or the fourth direction Y2) and the fifth direction Z1 (or the sixth direction Z2), the direction in which the fourth gas supply passages 421c and 421d are positioned may not be orthogonal to those in which the first and second gas supply passages 421a and 421b are positioned.

For convenience, it is assumed that the third gas supply passage 421c is connected to an inner sidewall, in the fourth direction Y2, of a light guide passage 520, and that the fourth gas supply passage 421d is connected to an inner sidewall, in the third direction Y1, of the light guide passage 520, e.g., the third and fourth gas supply passages 421c and 421d may extend from the gas cell housing at orthogonal angles to each other. Since, in the fourth gas cell 503, four gas supply passages are arranged symmetrically, the formation of a laminar flow can be further promoted. As a result, the reabsorption of EUV light "EUV" can be reduced, and the power of the EUV light "EUV" can be further enhanced.

Examples in which two or four gas supply passages are provided in a gas cell have been described above, but any number of gas supply passages may be provided to a gas cell as long as the gas supply passages are arranged symmetrically. That is, a gas cell of an EUV generating device according to some exemplary embodiments of the present disclosure may include eight, sixteen, or more than sixteen gas supply passages as long as the gas supply passages are arranged symmetrically. Alternatively, an odd number, e.g., three, five, or seven, gas supply passages may be provided in a gas cell as long as they are arranged symmetrically such that they offset each other, e.g., leaving only the velocity component in the second direction X2 to form a laminar flow.

An EUV generating device according to some exemplary embodiments of the present disclosure will hereinafter be described with reference to FIGS. 10 through 13, 16, and 17. Descriptions of elements or features that are the same as their respective counterparts of any one of the EUV generating devices according to the exemplary embodiments of FIGS. 1 through 15 will be omitted or simplified.

Figure 16:
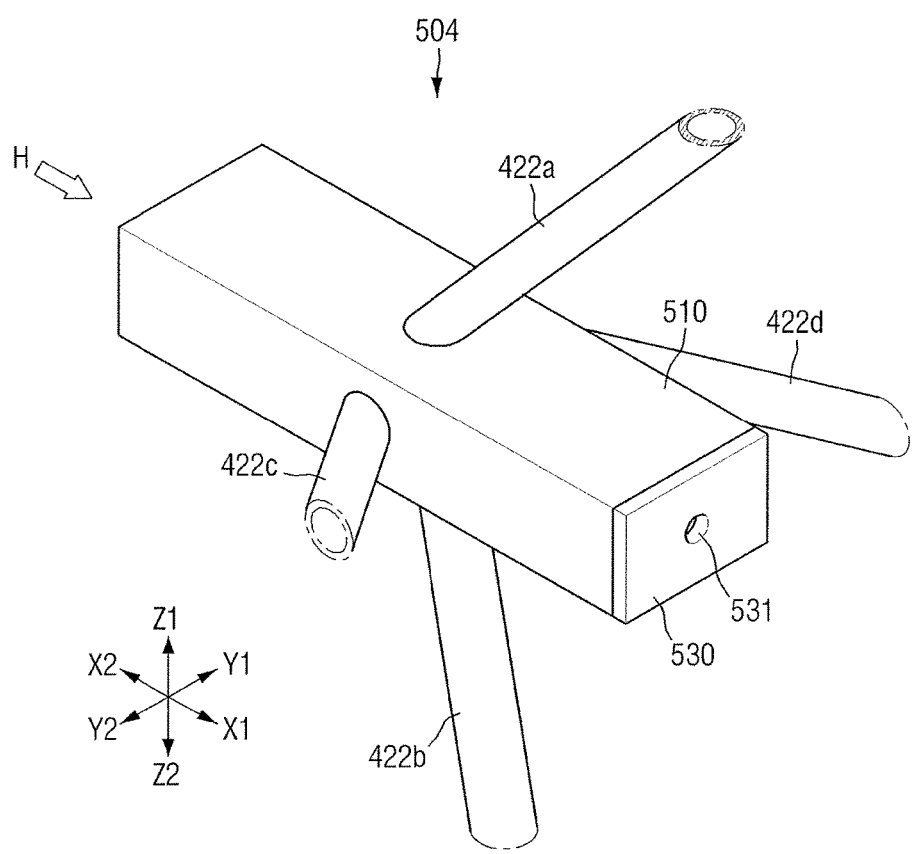
FIG. 16 illustrates a perspective view of an EUV generating device according to some exemplary embodiments of the present disclosure.
Figure 17:
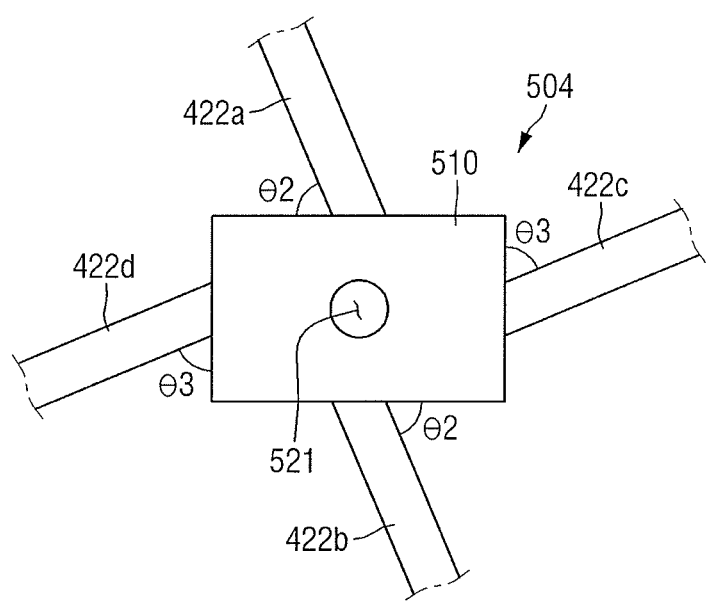
FIG. 17 illustrates a side view of a gas cell of FIG. 16 as viewed from a direction H of FIG. 16.

FIG. 16 is a perspective view of an EUV generating device according to some exemplary embodiments of the present disclosure. FIG. 17 is a side view of a gas cell of FIG. 16 as viewed from a direction H of FIG. 16. Referring to FIGS. 10 through 13, 16, and 17, the EUV generating device according to some exemplary embodiments of the present disclosure may include a fifth gas cell 504, in which four gas supply passages extend in a spiral manner. First and second gas supply passages 422a and 422b may be the same as their respective counterparts of FIGS. 10 through 13.

Specifically, third and fourth gas supply passages 422c and 422d may be inclined with respect to a light guide passage 520 in opposite directions. For example, on a plane defined by the first direction X1 (or the second direction X2) and a fifth direction Z1 (or the sixth direction Z2), the third and fourth gas supply passages 422c and 422d may be inclined, in the fifth and sixth directions Z1 and Z2, respectively, at a first acute angle θ1 with respect to the first direction X1 (or the second direction X2).

Also, as illustrated in FIG. 17, on a plane defined by the third direction Y1 (or the fourth direction Y2) and the fifth direction Z1 (or the sixth direction Z2), the third and fourth gas supply passages 422c and 422d may be inclined, in opposite directions, at a third acute angle θ3 with respect to the third direction Y1 (or the fourth direction Y2). Specifically, the third gas supply passage 422c may be inclined toward the fifth direction Z1, and the fourth gas supply passage 422d may be inclined sixth the sixth direction Z2, opposite the fifth direction Z1. The third acute angle θ3 may be the same as, or different from, the second acute angle θ2.

FIG. 17 illustrates the first, second, third, and fourth gas supply passages 422a, 422b, 422c, and 422d as being inclined counterclockwise. Alternatively, the first, second, third, and fourth gas supply passages 420a, 420b, 420c, and 420d may be inclined clockwise.

An EUV generating device according to some exemplary embodiments of the present disclosure will hereinafter be described with reference to FIGS. 18 through 21. Descriptions of elements or features that are the same as their respective counterparts of any one of the EUV generating devices according to the exemplary embodiments of FIGS. 1 through 17 will be omitted or simplified.

Figure 18:
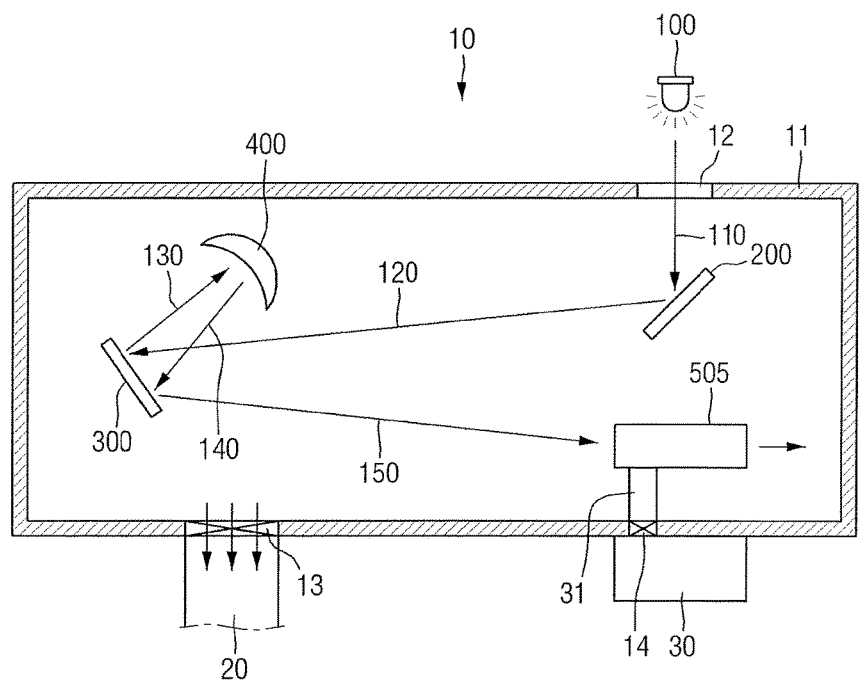
FIG. 18 illustrates a schematic view of an EUV generating device according to some exemplary embodiments of the present disclosure.
Figure 19:
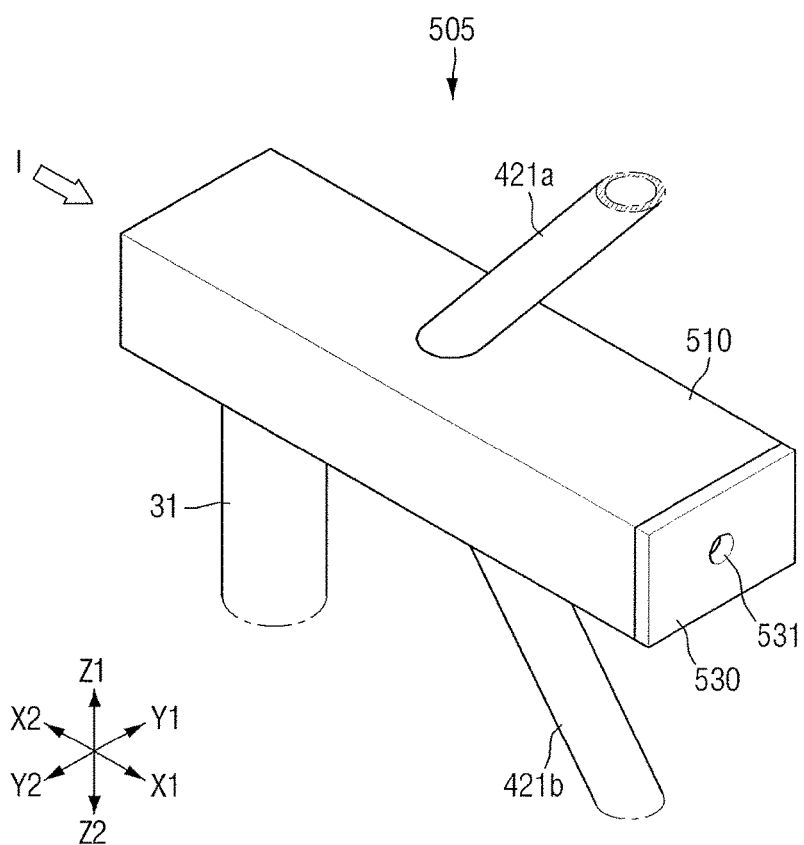
FIG. 19 illustrates a perspective view of a gas cell of FIG. 18.
Figure 20:
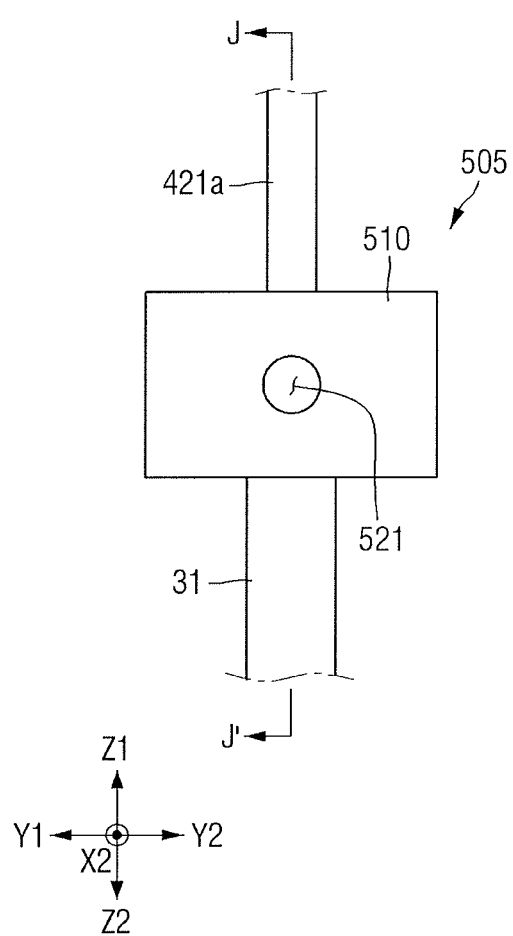
FIG. 20 illustrates a side view of the gas cell of FIG. 19 as viewed from a direction I of FIG. 19.
Figure 21:
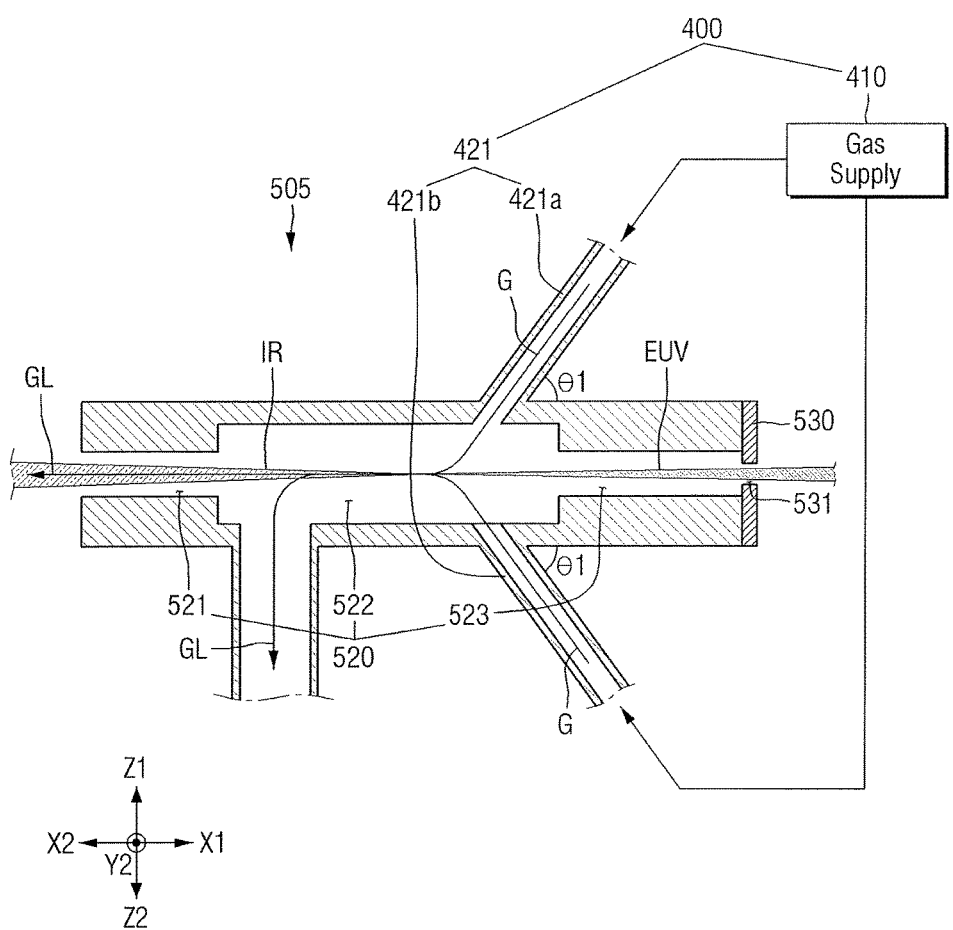
FIG. 21 illustrates a cross-sectional view taken along line J-J' of FIG. 20.

FIG. 18 is a schematic view of an EUV generating device according to some exemplary embodiments of the present disclosure, FIG. 19 is a perspective view of a gas cell of FIG. 18, FIG. 20 is a side view of the gas cell of FIG. 19 as viewed from a direction I of FIG. 19, and FIG. 21 is a cross-sectional view taken along line J-J' of FIG. 20. Referring to FIGS. 18 through 21, the EUV generating device according to some exemplary embodiments of the present disclosure may include a dry pump 30, an exhaust unit 31, a pump hole 14, and a sixth gas cell 505, which is connected to the exhaust unit 31.

The dry pump 30 may be outside of the vacuum chamber 10. The dry pump 30 may be connected to the exhaust unit 31 through the pump hole 14. The dry pump 30 may suck the gas out of the sixth gas cell 505. That is, leftover plasma reaction gas GL in the sixth gas cell 505 may be discharged to the outside of the sixth gas cell 505 by the dry pump 30.

The exhaust unit 31 may be a part connecting the dry pump 30 and the sixth gas cell 505. The exhaust unit 31 may be a passage through which the leftover plasma reaction gas GL is discharged from the sixth gas cell 505. The exhaust unit 31 may be connected to the outside of the vacuum chamber 10 through the pump hole 14. The pump hole 14 may be formed on an outer wall 11 of the vacuum chamber 10 and may thus allow the exhaust unit 31 to be connected to the dry pump 30.

The sixth gas cell 505 may release the leftover plasma reaction gas GL through the exhaust unit 31. The exhaust unit 31 may be spaced apart from gas supply passages in the second direction X2 and may overlap, e.g., be positioned beneath, the incident portion 521 along the sixth direction Z2. Accordingly, the exhaust unit 31 may become a passage through which airflow generated by the gas supply passages 420 is released.

The pressure inside the vacuum chamber 10 may be lower than the pressure inside the sixth gas cell 505. Accordingly, the leftover plasma reaction gas GL may be released from the incident portion 521. Thus, some of the leftover plasma reaction gas GL may be may be released to the vacuum chamber 10 through the incident portion 521 to then be discharged to the outside of the vacuum chamber 10 by an exhaust device 20, while remaining leftover plasma reaction gas GL may be discharged directly to the outside of the vacuum chamber 10 through the exhaust unit 31.

According to the exemplary embodiment of FIGS. 18 through 21, the discharge of the plasma reaction gas G from the sixth gas cell 505 can be further promoted, and as a result, the power of EUV light "EUV" can be further enhanced. The exhaust unit 31, the dry pump and the pump hole 14 may be used in connection with any of the first to fifth gas cells 500 to 504.

Exemplary embodiments of the present disclosure provide an extreme ultraviolet (EUV) generating device capable of improving the intensity of EUV light by reducing the leakage of a plasma reaction gas. In particular, exemplary embodiments may reduce an amount of leftover plasma reaction gas, which absorbs EUV light, in the optical path of the EUV light. One or more exemplary embodiments may form a flow path of plasma gas that is opposite to the optical path of the EUV light.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An extreme ultraviolet (EUV) generating device, comprising:
    a gas cell housing extending in a first direction;
    a light guide passage extending through the gas cell housing in the first direction, the light guide passage including
        an incident portion to receive incident light,
        a plasma reaction portion, extending from the incident portion in the first direction, to generate EUV light when the incident light and a plasma reaction gas interact, and
        an emission portion, extending from the plasma reaction portion in the first direction, to emit the EUV light in the first direction; and
    a gas supply passage connected to the plasma reaction portion at a side of the gas cell housing at an acute angle with respect to the first direction, the gas supply passage to supply the plasma reaction gas to the plasma reaction portion.

2. The EUV generating device as claimed in claim 1, wherein:
    the gas cell housing has a first side in a second direction, orthogonal to the first direction, and a second side in a third direction, opposite to the second direction, and
    the gas supply passage includes a first gas supply passage, which extends from the first side, and a second gas supply passage, which extends from the second side.

3. The EUV generating device as claimed in claim 2, wherein:
    the gas cell housing has a third side in a fourth direction, orthogonal to the first direction and crossing the second direction, and a fourth side in a fifth direction, opposite to the fourth direction, and
    the gas supply passage further includes a third gas supply passage, which extends from the third side, and a fourth gas supply passage, which extends from the fourth side.

4. The EUV generating device as claimed in claim 2, wherein:
    the first gas supply passage is inclined in a sixth direction, orthogonal to the first and second directions, and
    the second gas supply passage is inclined in a seventh direction, opposite to the sixth direction.

5. The EUV generating device as claimed in claim 2, wherein:
    an angle between the first gas supply passage and the light guide passage is a first acute angle, and
    an angle between the second gas supply passage and the light guide passage is the first acute angle.

6. The EUV generating device as claimed in claim 2, wherein the gas supply passage is inclined toward the emission portion.

7. The EUV generating device as claimed in claim 1, further comprising:
    a vacuum chamber surrounding the gas cell housing.

8. The EUV generating device as claimed in claim 7, wherein a pressure inside the gas cell housing is higher than a pressure outside the gas cell housing.

9. The EUV generating device as claimed in claim 1, wherein the plasma reaction gas is discharged from the inside to the outside of the gas cell housing through the incident portion.

10. The EUV generating device as claimed in claim 1, wherein cross-sectional areas, in the first direction, of the incident portion and the emission portion are smaller than a cross-sectional area, in the first direction, of the plasma reaction portion.

11. An extreme ultraviolet (EUV) generating device, comprising:
    a light source to output an infrared (IR) laser pulse; and
    a gas cell to receive the IR laser pulse and a plasma reaction gas, and to generate EUV light,
    wherein the gas cell includes a light guide passage through which the IR laser pulse passes and a gas supply passage connected to the light guide passage at a first acute angle to the light guide passage, the gas supply passage to supply the plasma reaction gas.

12. The EUV generating device as claimed in claim 11, wherein:
    the IR laser pulse travels in a first direction, and
    the plasma reaction gas is discharged from the gas cell in a direction opposite to the first direction.

13. The EUV generating device as claimed in claim 11, wherein:
    the light guide passage includes a first region where the IR laser pulse is transmitted in a first direction, and a second region where EUV light is transmitted in the first direction,
    the second region adjoins the first region in the first direction, and
    the EUV light is generated in response to the IR laser pulse and the plasma reaction gas interacting with each other.

14. The EUV generating device as claimed in claim 13, wherein:
    the plasma reaction gas has a first density in the first region and a second density in the second region, and
    the first and second densities are different from each other.

15. The EUV generating device as claimed in claim 14, wherein the first density is greater than the second density.

16. An extreme ultraviolet (EUV) generating device, comprising:
    a gas cell housing including a light guide passage, which extends in a first direction, incident light incident in the first direction to pass through the light guide passage along the first direction; and
    a gas supply module extending from a side of the gas cell housing, the gas supply module to inject a plasma reaction gas into the light guide passage such that the plasma reaction gas flows in a second direction, opposite to the first direction,
    wherein the gas supply module includes a gas supply passage that forms a first acute angle with the light guide passage.

17. The EUV generating device as claimed in claim 16, wherein the gas supply passage is inclined in the first direction.

18. The EUV generating device as claimed in claim 16, wherein
    the light guide passage includes an incident portion, a plasma reaction portion, and an emission portion, sequentially connected along the first direction,
    the incident light is incident upon the incident portion,
    in the plasma reaction portion, EUV light is generated in response to the plasma reaction gas and the incident light reacting with each other, and
    the EUV light is discharged out of the light guide passage through the emission portion.

19. The EUV generating device as claimed in claim 18, wherein the gas supply passage is connected to the plasma reaction portion.

20. The EUV generating device as claimed in claim 18, wherein a plurality of gas supply passages are provided.

* * * * *